(12) United States Patent
Specht

(10) Patent No.: US 6,343,759 B1
(45) Date of Patent: *Feb. 5, 2002

(54) SEAT BELT RETRACTOR

(75) Inventor: Martin Specht, Feldafing (DE)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/665,998

(22) Filed: Sep. 20, 2000

(30) Foreign Application Priority Data

Mar. 21, 2000 (DE) .......................... 100 13 870

(51) Int. Cl.[7] .................... B60R 22/28; B60R 22/44; B60R 22/46
(52) U.S. Cl. .............. 242/375.1; 242/374; 242/379.1; 242/390.8; 280/806; 280/807
(58) Field of Search .................. 242/375.1, 375.3, 242/390.8, 390.9, 374, 379.1; 280/806, 807; 297/476, 477, 478

(56) References Cited

U.S. PATENT DOCUMENTS

| 4,592,520 A | * | 6/1986 | Kawaguchi | 242/375.1 |
| 4,637,630 A | * | 1/1987 | Nishimura et al. | 280/807 |
| 5,611,497 A | * | 3/1997 | Krambeck et al. | 242/375.1 |

FOREIGN PATENT DOCUMENTS

| DE | 2742676 | 4/1979 |
| DE | 8009960 | 8/1980 |
| DE | 3019298 | 11/1981 |
| DE | 3149573 | 6/1983 |
| DE | 3933721 | 4/1991 |
| DE | 4112620 | 5/1992 |
| DE | 29605200 | 8/1996 |
| DE | 19636448 | 4/1997 |
| DE | 19647841 | 5/1998 |
| DE | 4322798 | 2/1999 |
| DE | 19752338 | 6/1999 |
| DE | 19731689 | 7/1999 |
| EP | 0893313 | 7/1998 |
| JP | 10167002 | 6/1998 |
| WO | 8706545 | 11/1987 |
| WO | 0047454 | 8/2000 |

* cited by examiner

Primary Examiner—John M. Jillions
(74) Attorney, Agent, or Firm—Lonnie Drayer

(57) ABSTRACT

A seat belt retractor has a belt reel that is mounted rotatably on a frame. A motive spring biases the belt reel in a winding direction. An electrical driving device adjusts the spring force of the motive spring. A clutch located between the electrical driving device and the belt reel transmits torque produced by the electrical driving device to the belt reel. The clutch has a spring that can be deformed by torque and, when deformed, brings the clutch into an engaged state.

17 Claims, 5 Drawing Sheets

SEAT BELT RETRACTOR

FIELD OF THE INVENTION

The present invention relates to a seat belt retractor.

BACKGROUND OF THE INVENTION

Seat belt retractors are normally equipped with motive springs that constantly apply force on a seat belt webbing. A seat belt retractor of this type is known from DE 41 12 620. An electric motor in a seat belt retractor adjusts the spring casing of the motive spring to vary the retraction force on the seat belt webbing for improving a vehicle occupant's comfort. The retraction force is altered by rotationally adjusting an external fixing point of the motive spring. The retraction force is reduced when the seat belt is buckled. When the seat belt is taken off, the external fixing point of the motive spring can be adjusted such that the motive spring exerts an increased retracting force on the webbing.

It is also known for a seat belt retractor to have a pretensioner and a load limiter. One type of pretensioner utilizes a clutch to rotate the belt reel. Pretensioners of this type are disclosed in DE 296 05 200 U1 and DE 196 47 841 A1. A seat belt retractor can also have a load limiter that limits or reduces the load acting on the vehicle occupant during the locking of the belt reel.

SUMMARY OF THE INVENTION

The present invention provides rapid removal of slack in a seat belt webbing by a pretensioner. A clutch transmits torque produced by an electrical driving device to the belt reel. The clutch has a spring that can be deformed by torque, and when deformed brings the clutch into an engaged state.

The spring is preferably a wrap spring wherein one end of the spring is connected to the electrical driving device and the other end of the spring is connected to the belt reel. The end of the spring that is connected to the belt reel can be locked into place by a clutch locking mechanism. The clutch locking mechanism is moved by an actuating device to create an interlocking fit with the belt reel. The locking of one end of the spring during production of the torque enables the spring to be deformed by the torque acting on the other end of the spring. The clutch is brought into an engaged state by this deformation.

If the spring is a wrap spring, the cylindrical spring region is deformed radially and is brought directly into a non-interlocking contact, in particular frictional contact, with the belt reel or with a part connected non-rotatably to the belt reel. The torque supplied by the electrical driving device is transmitted directly to the belt reel by this non-interlocking contact.

For transmitting the torque, a driver, that is preferably mounted in a rotatable manner around the belt reel axis, can be arranged between the electrical driving device and the side of the spring onto which the torque is transmitted.

As the torque supplied by the electrical driving device for actuating the clutch initially deforms a spring, abrupt transmission of the torque from the electrical driving device to the belt reel is avoided.

The actuating device for the adjusting element is adjusted to produce the interlocking fit between belt reel and the side of the spring to be held, can act mechanically, electrically, or electromagnetically. The adjusting element is preferably moved radially in relation to the belt reel axis. A lifting magnet can act on the adjusting element for this purpose.

The adjusting element can comprise a bearing for a clutch locking mechanism, with which the interlocking fit between the side of the spring to be held and the belt reel is produced. The clutch locking mechanism is preferably annular in design and is mounted in a rotatable manner. The clutch locking mechanism has internal teeth, which can be engaged with corresponding teeth connected to the belt reel. The clutch locking mechanism can also engage an annular bearing part of one end of the spring. This annular bearing part can also comprise teeth complementary to the internal teeth of the clutch locking mechanism.

The actuating device is activated and torque is supplied to the spring when the probability of a crash is high. Potential crash causing factors include, for example, full braking, skidding of the vehicle, different coefficients of friction on the vehicle wheels in relation to the roadway, the springing out of a wheel or high angular velocity of steering. Situations of this type involving a probability a crash can be detected by appropriate sensors.

When the clutch is engaged the torque produced by the electrical driving device is transmitted to the belt reel for the reversible pretensioning of the seat belt. While the clutch is engaged, the torque supplied by the electrical driving device is maintained for acting on the winding shaft. If no crash occurs the actuating device is deactivated so that the clutch locking mechanism producing the interlocking fit between one side of the spring and the belt reel is disengaged.

The chance of destruction of the load carrying parts during the transmission of torque by the incorporation of a damping device into the seat belt retractor is reduced by the present invention. The damping device, preferably arranged between the electrical driving device and the driver, compensates for the overload between the driver and the electrical driving device, in particular a set of worm gears at the output of the electrical driving device and the driver. This damping device preferably stores energy in the loaded state. This energy can also be used to release the blocking of the belt reel so that the belt reel is on standby for undecelerated extraction of webbing during normal operation.

The present invention also adjusts the retracting force on the seat belt webbing while the seat belt is in use to provide comfort for the vehicle occupant.

DETAILED DESCRIPTION OF THE INVENTION

Figure 1:
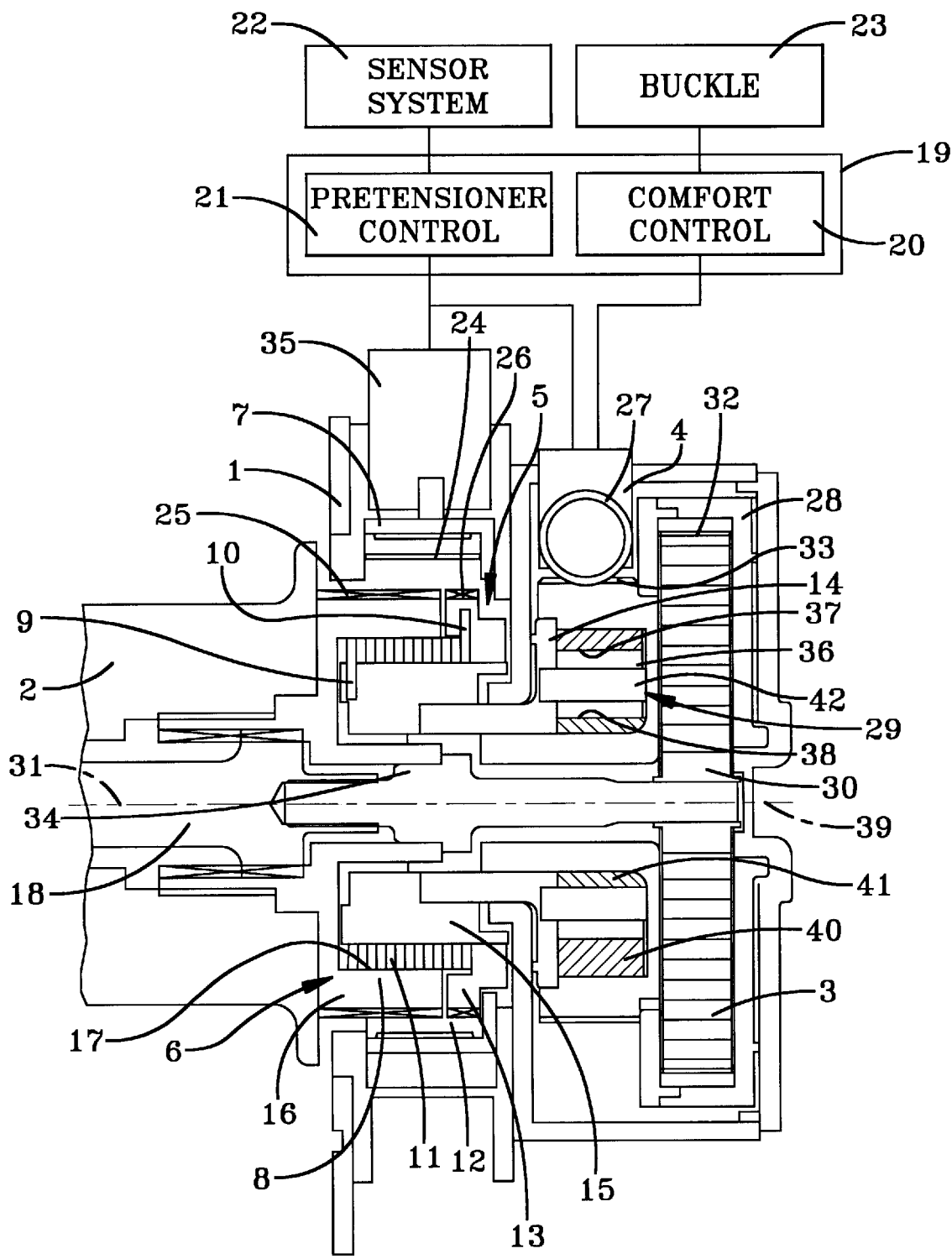
FIG. 1 is a sectional view of the spring side of a seat belt retractor and a block diagram of a controller.

FIG. 1 is a sectional view of the spring side of a seat belt retractor. The seat belt retractor has a belt reel 2 mounted in a rotatable manner on a frame 1. The belt reel is used for winding and unwinding a seat belt, not shown in detail. The belt reel is biased in a winding direction by a motive spring 3. In its interior, the motive spring has a spring core 30 for transmitting the biasing force of the motive spring 3 to the belt reel 2. The motive spring 3 is fastened on a spring cartridge 28 by an external fixing point 32. An electrical driving device 4, preferably an electric motor, adjusts the spring force. The output shaft of the electrical driving device 4 acts on the spring cartridge 28 via a worm 27 on a worm gear 33.

The amount of retraction force on the webbing will vary depending on whether the seat belt is in use. If a buckle sensor 23 detects that a seat belt is in use the comfort controller 20 will signal the electrical driving device 4 to reduce the biasing force of the motive spring 3. The comfort level of the seat belt perceived by vehicle occupant is therefore improved. The speed is relatively low for this comfort adjustment. When the seat belt is unbuckled the opening of the buckle is detected by the buckle sensor 23 and the electrical driving device 4 is controlled by the comfort controller 20 in such a way that the biasing force of the motive spring 3 is increased. The seat belt is therefore wound into its fully retracted position on the belt reel 2 with an increased biasing force.

In the embodiment illustrated, the torque produced by the electrical driving device 4 is used not only to adjust the spring force of the motive spring 3 but also for pretensioning the seat belt. A clutch 5 that is disengaged during normal vehicle travel is provided between the output shaft, or the worm gear 27, and the belt reel 2. When the clutch is disengaged, the biasing force of the motive spring acts on the belt reel as described in detail above.

If a high probability that a crash may occur is detected by the vehicle sensor system 22, the electrical driving device 4 and an actuating device 35 are triggered by a pretensioner controller 21 connected to the sensor system 22. The pretensioner controller 21, together with the comfort controller 20, can be part of a central controller 19. In the embodiment shown in FIG. 1, the actuating device 35 is activated electrically by a signal supplied by the pretensioner controller 21. When the actuating device is activated and the electrical driving device 4 is switched on, the clutch 5 is engaged so the torque supplied by the electrical driving device is transmitted directly to the belt reel 2.

In the embodiment illustrated, the clutch 5 has a deformable spring 6 which, when it is deformed, brings the clutch into an engaged state. The spring is deformed by torque supplied by the electrical driving device 4. This torque is optionally transmitted via a damping device 29 to a driver 14 which is mounted in a rotatable manner around an axial projection 34 of the belt reel 2 coaxially to the belt reel axis 31. The biasing force of the motive spring 3 can also be transmitted to the belt reel 2 by this axial projection 34 of the belt reel. The driver 14 is rigidly connected to one end of the spring 6. This end of the spring is a spring arm 9 in the embodiment illustrated. In the embodiment illustrated, the spring is a wrap spring, in particular a spiral coiled wrap spring. The wrap spring is formed from a spring wire that has a rectangular cross-section and is wound with a cylindrical spring region 8 around a cylindrical part 15 of the driver 14. The cylindrical part 15 acts as a spring mandrel of the spring 6.

The other end of the spring in the form of a spring arm 10 is connected rigidly to a bearing part 13 that is also mounted in a rotatable manner on the cylindrical part 15 of the driver 14. In the embodiment illustrated the bearing part is annular.

The cylindrical spring region 8 of the spring 6 is located in an annular space formed between the cylindrical part 15 of the driver 14 and a hollow cylinder 16 connected in a non-rotatable manner to the belt reel 2. The hollow cylinder 16 has teeth 25 on its external circumference. The annular bearing part 13 also has teeth 26 on its external circumference. The two sets of teeth 25, 26 are mutually aligned, in other words they lie on the same radii.

A clutch locking mechanism 12 is mounted in a rotatable manner on an adjusting element 7 around the hollow cylinder 16 and the annular bearing part 13. The clutch locking mechanism 12 is mounted so that it can freely rotate during normal operation of the seat belt retractor. At its internal circumference, the clutch locking mechanism 12 has internal teeth 24 that can be brought into engagement with the hollow cylinder 16 and the bearing part 13 simultaneously with the teeth 25 and 26. For this purpose, the adjusting element 7 is displaced radially in relation to the belt reel axis 31 on activation of the actuating device 35, as shown by the arrows in FIG. 1. The internal teeth 24 on the clutch locking mechanism 12 engage the two sets of teeth 25, 26 on the hollow cylinder 16 and bearing part 13 within a specific circumferential angle range. The clutch locking mechanism 12 adopts an eccentric position in relation to the hollow cylinder 16 and the annular bearing part 13. For this purpose, the actuating device 35 can be a lifting magnet, which as it is activated, displaces the adjusting element 7 radially in relation to the belt reel axis 31. However, it is also possible to bring about the adjusting movement of the adjusting element 7 on the basis of inertial force or centrifugal force by an inert mass.

The torque transmitted via the driver 14 by the electrical driving device 4 acts upon the spring arm 9. The other spring arm 10 is connected to the bearing part 13, which is connected to the belt reel 2. With one end of the spring 6 locked by the clutch locking mechanism 12 and with torque being transmitted to the other side of the spring 6, the cylindrical spring region 8 of the spring is deformed and increases its diameter until frictional contact with the internal wall 17 of the hollow cylinder 16 is produced. Frictional contact between the electrical driving device 4 and the belt reel 2 is produced by which the torque is transmitted to the belt reel 2. This torque acts in the belt winding direction, so that the seat belt is pretensioned. Pretensioning of the seat belt can be produced not only in situations that are critical to travel and in which there is a high probability of a crash, but also when pretensioning is required in a crash.

If no crash has occurred, but pretensioning has been initiated by the sensor system 22 due to a potential crash, the torque maintained by the electrical driving device 4 is reduced or shut off after a predetermined period of time. The spring 6 passes back into its starting position because of its restoring force. The frictional contact between the cylindrical spring region 8 and the internal wall 17 of the hollow cylinder 16 is thus released. The electrical driving device 4 can then be switched back into the comfort control of the motive spring 3. The restoring force of the spring can also be used to disengage a blocking pawl from the belt reel.

The damping device 29, of which embodiments are shown in FIGS. 2 to 5, is designed in such a way that it stores energy when loaded. The loaded state arises during operation of the pretensioner when torque is transmitted from the electrical driving device 4 to the belt reel 2. The damping device 29 comprises an elastically deformable torque-transmitting means that is brought by the deformation of the torque-transmitting means into a state where it stores energy. This results from the elastic deformation of the elastic damping elements during the transmission of torque.

Figure 2:
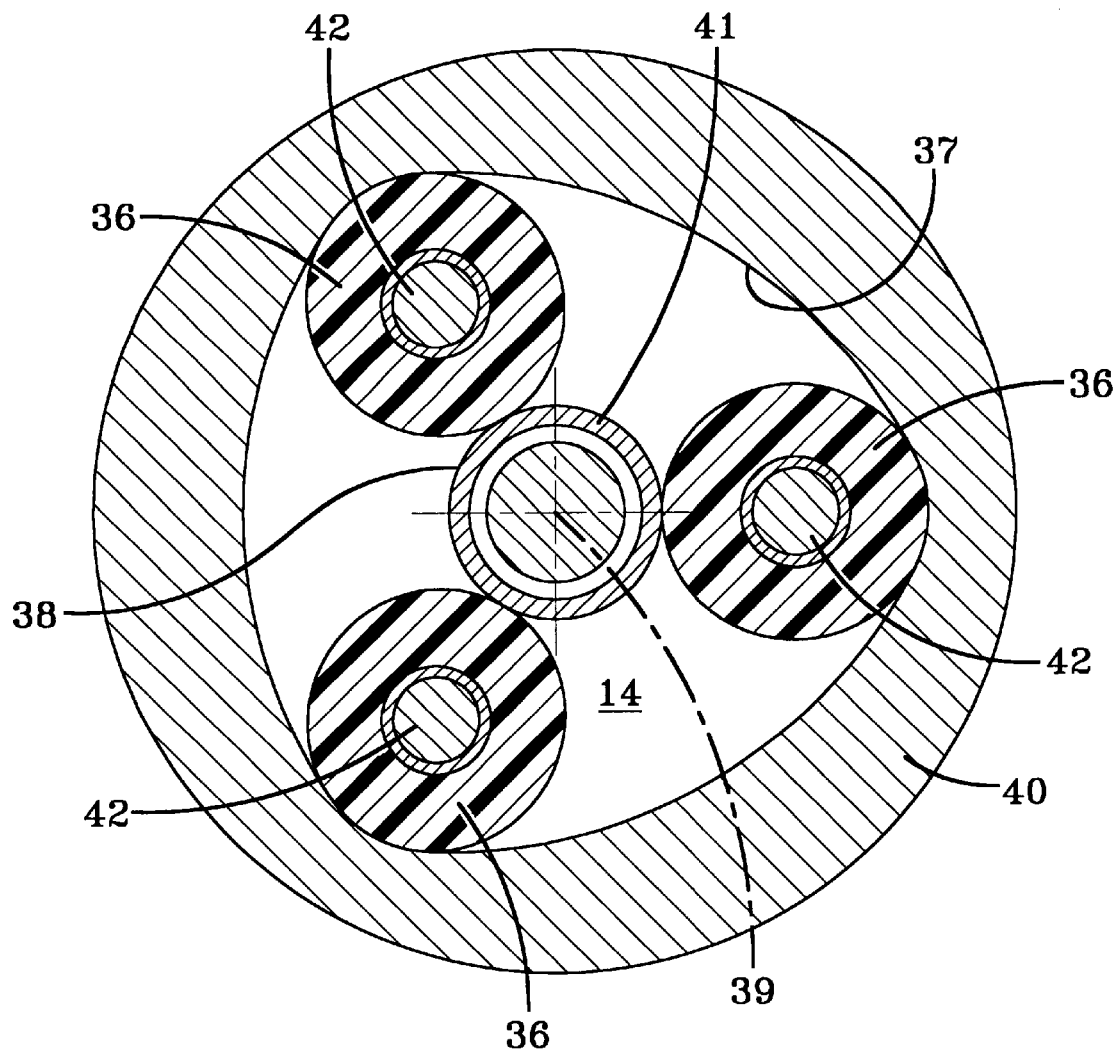
FIG. 2 shows a first embodiment of a damping device.
Figure 3:
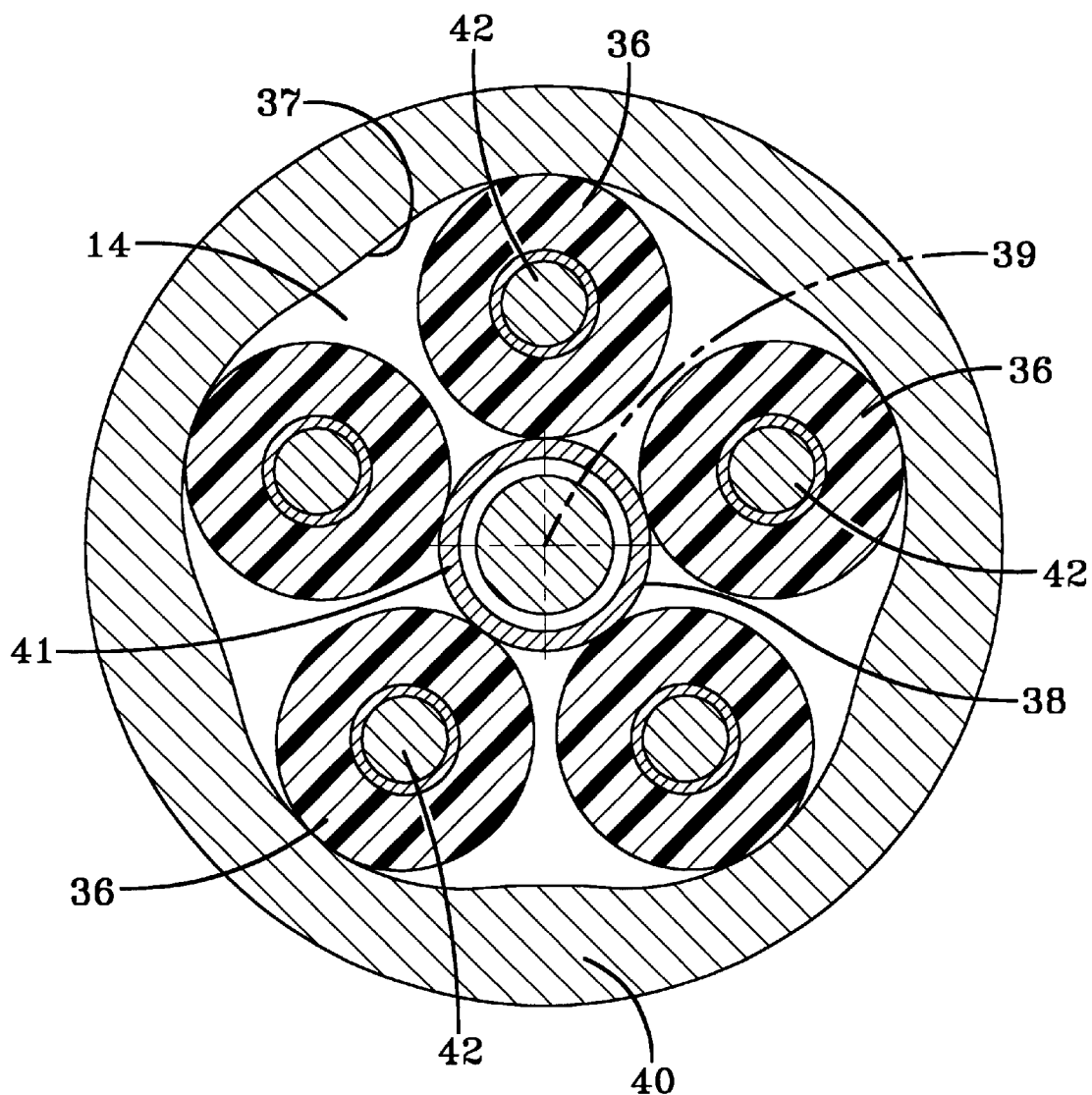
FIG. 3 shows a second embodiment of a damping device.

In the embodiments shown in FIGS. 2 and 3, the deformable torque-transmitting damping elements are rolling bodies 36 comprise an elastic material, preferably having a Shore hardness of 50 to 90. Three rolling bodies 36 are used in the embodiment shown in FIG. 2 and five rolling bodies 36 in the embodiment shown in FIG. 3. It is possible, however, to use only one rolling body 36 as elastic damping element. It is preferable to use an odd number of rolling bodies 36.

The elastically deformable rolling bodies 36 are arranged between two telescoping rings 40, 41. A rolling track around a rolling axis 39 is defined between these rings for the respective rolling bodies. The rolling track around the rolling axis 39 is formed between two rolling surfaces 37, 38. The internal rolling surface 38 has a cylindrical configuration and is formed by the external surface of the inner ring 41. The external rolling surface 37 is formed on the interior of the outer ring 40. As shown in FIGS. 2 and 3, the distance between the two rolling surfaces 37, 38 varies along the path of the rolling bodies 36 around the rolling track axis 39. When the respective elastically deformable rolling body 36 is moved from its starting position during the transmission of torque, it rolls on the rolling surfaces 37, 38 and passes into a region in which the distance between the two rolling surfaces 37, 38 decreases. The elastic material of the respective rolling body 36 is thus compressed. In addition to the damped transmission of torque, this also results, as already described, in the rolling bodies being in a higher energy state.

Figure 4:
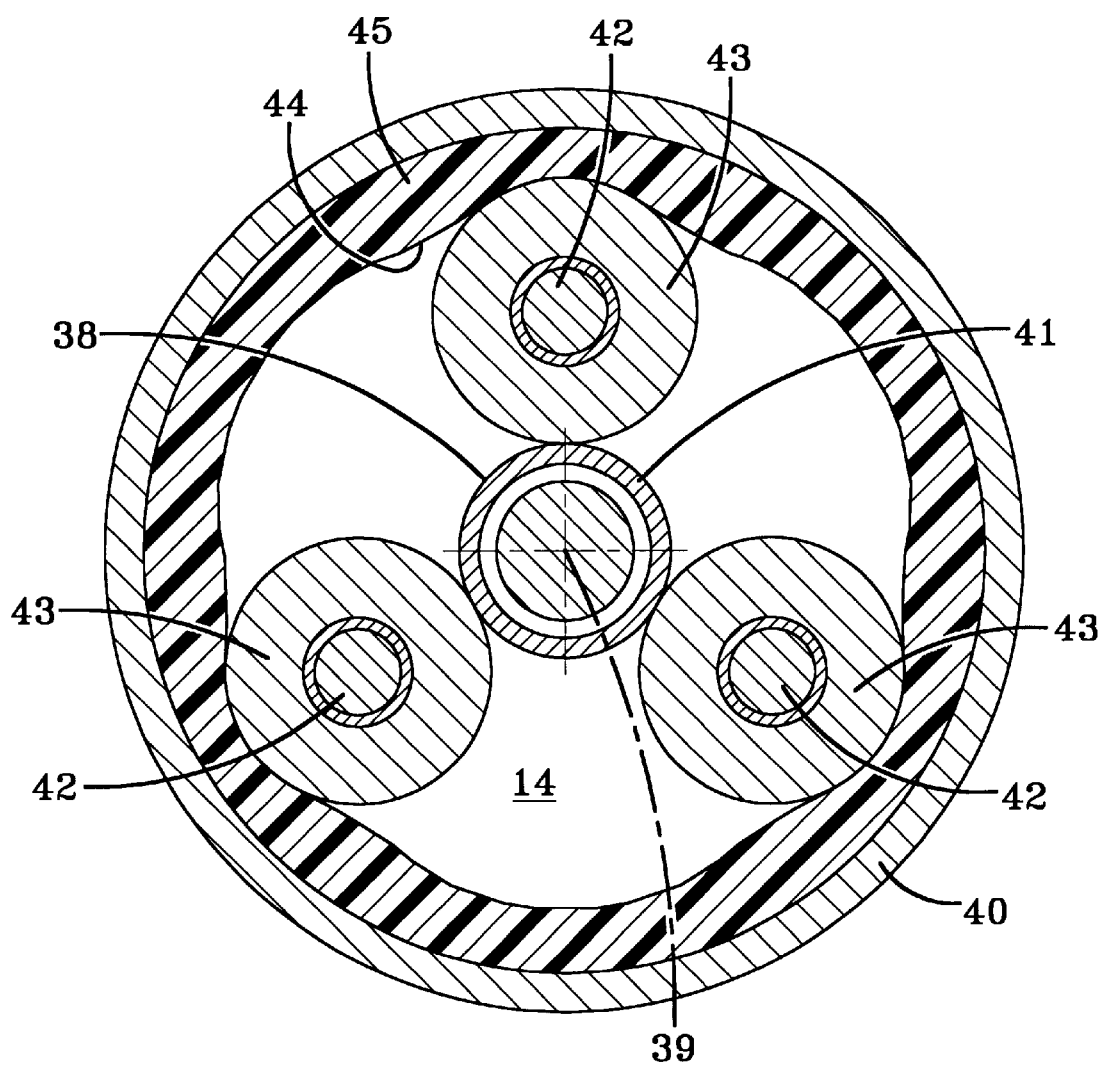
FIG. 4 shows a third embodiment of a damping device.
Figure 5:
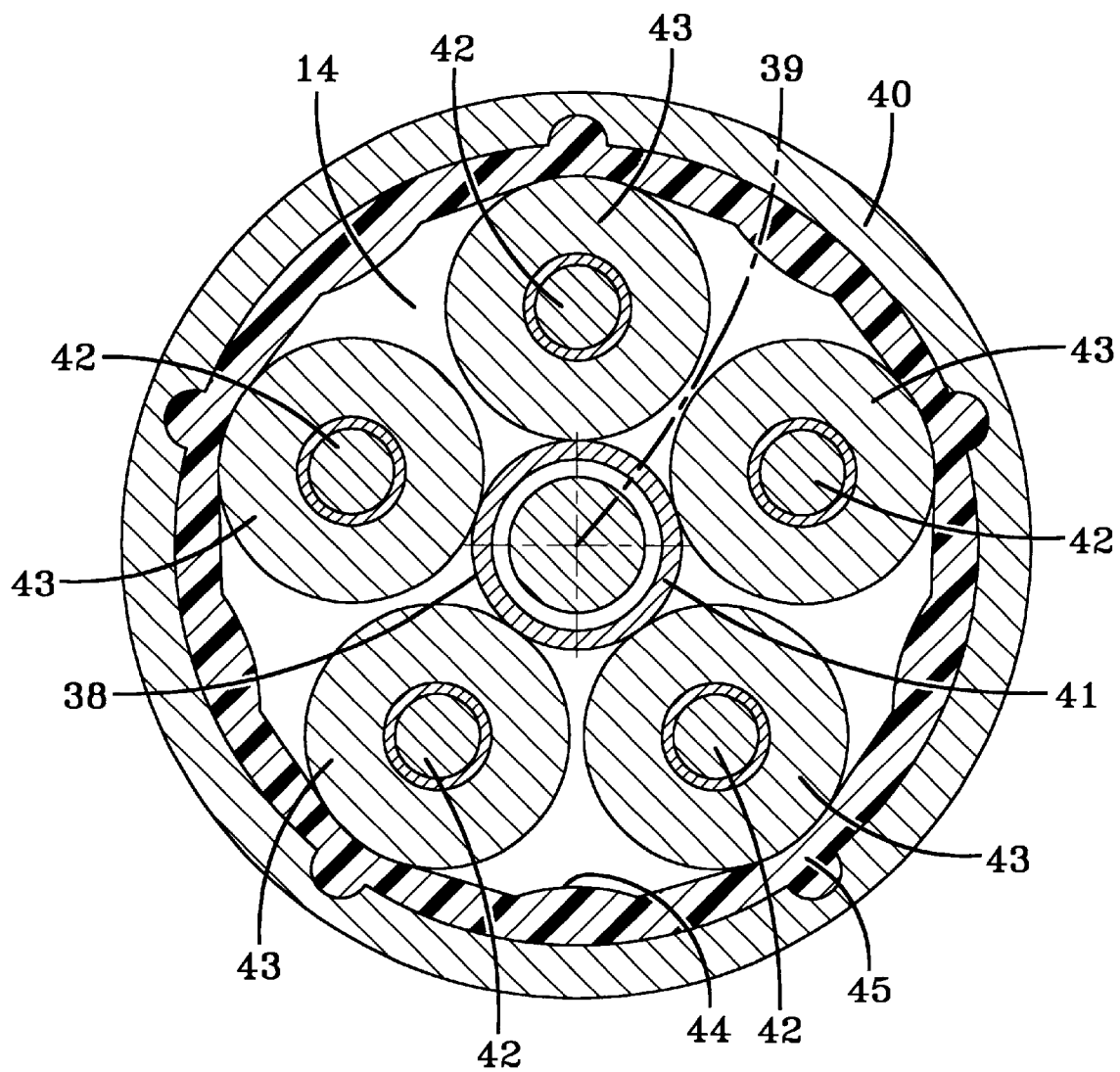
FIG. 5 shows a fourth embodiment of a damping device.

In the embodiment shown in FIGS. 4 and 5, rolling bodies 43 are formed from hard material, for example steel, and one of the two rolling surfaces, preferably the material 45 that provides the external rolling surface 44 comprises an elastic material. Otherwise, the construction of the two embodiments of the damping devices in FIGS. 4 and 5 is the same as in the embodiments in FIGS. 2 and 3.

As shown in FIG. 1, the outer ring 40 is connected in a non-rotatable manner to the worm gear 33. The rolling bodies 36, 43 are mounted in a rotatable manner in bearings 42 on the driver 14.

During the driving of the outer ring 40 for pretensioning the webbing, the outer ring is driven at a speed higher than the comfort adjustment of the motive spring 3. To dampen the driving movement, the rolling bodies 36, 43 are moved into the regions between the two rings 40, 41 in which the distance between the rolling surfaces 37 or 44 and 38 is reduced. The rolling bodies 36, 43 are then held in specific positions in the regions with a reduced distance between the rolling surfaces 37 or 44 and 38, and the rotational movement of the outer ring 40 is transmitted to the driver 14. The clutch 5 is then engaged, as already described above, and the pretensioning torque transmitted to the belt reel 2. The stored energy can then optionally be used to release a blocking pawl, not shown in detail, from its blocking engagement with the belt reel for turning back the belt reel 2.

If extraction of the belt reel is decelerated by the load limiter 18 in the event of a crash, the rotational movement is transmitted via the engaged clutch to the driver 14 and therefore to the rolling bodies 36. One to five rotations can take place, depending on the magnitude of force generated by the forwardly displaced body of the vehicle occupant. The rolling bodies 36, 43 are also rotated around the rolling track axis 39 along their orbit and find a new starting point in this turning back phase. Damage to the set of worm gears 33 and worm 27 is thus prevented. It is also possible for the seat belt webbing to be pretensioned in the event of a subsequent crash in the manner already described.

The inner ring 41 is preferably a free-wheel ring that encircles the rolling track axis 39. The rolling track axis is coaxial with the belt reel axis 31 in the embodiment illustrated. The cylindrical surface of the inner ring 41 forming the rolling surface 38 can be correspondingly rough in design, for example with slight knurling, to avoid slipping.

A suitable elastic polymer for the rolling bodies 36 or the rolling surface 44 can be an ethylene propylene elastomer, for example EPDM (ethylene/propylene/diene terpolymers).

Numerous modifications may be made of this invention without departing from the scope as defined in the appended claims.

I claim:

1. A seat belt retractor comprising:
   (a) a belt reel mounted in a non-rotatable manner on a frame;
   (b) a motive spring that biases the belt reel in a winding direction;
   (c) an electrical driving device that adjusts a spring force of the motive spring;
   (d) a clutch located between the electrical driving device and the belt reel to transmit a torque produced by the electrical driving device to the belt reel, the clutch comprising a deformable spring that can be deformed by the torque and when deformed, brings the clutch into an engaged state, a first end of the deformable spring is connected via a bearing part to the electrical driving device and a second end of the deformable spring is connected via an adjusting element, that can be moved by an actuating device in response to a signal from a vehicle sensor, to the belt reel via an interlocking fit, the interlocking fit between the deformable spring and the belt reel is formed by a clutch locking mechanism that can be brought by the adjusting element into coupling engagement with the belt reel, wherein the clutch locking mechanism has an annular configuration with peripheral teeth, the clutch locking mechanism in the engaged state being located in a position eccentric to the belt reel axis and the teeth engaging in part with peripheral teeth connected in a non-rotatable manner to the belt reel.

2. The seat belt retractor according to claim 1 wherein a deforming spring region of the deformable spring can be brought directly into frictional contact with the belt reel for the transmission of torque, the deformable spring being located between a driver driven by the electrical driving device and the belt reel.

3. The seat belt retractor according to claim 1 wherein the deformable spring is a wrap spring that has a rectangular cross-section and has terminal arms with one arm connected to the electrical driving device and the other arm connect via the adjusting element to the belt reel.

4. The seat belt retractor according to claim 1 wherein the deformable spring is wrapped around a cylindrical part of a driver and its exterior can be moved into frictional contact with an internal wall of a hollow cylinder connected in a non-rotatable manner to the belt reel.

5. The seat belt retractor according to claim 1 wherein the engaged state of the clutch is maintained by torque supplied by the electrical driving device.

6. The seat belt retractor according to claim 1 wherein the actuating device can move the adjusting element radially in relation to the belt reel axis.

7. The seat belt retractor according to claim 1 wherein a set of worm gears is provided at the output of the electrical driving device for transmitting torque.

8. A seat belt retractor comprising:
   (a) a belt reel mounted in a non-rotatable manner on a frame;
   (b) a motive spring that biases the belt reel in a winding direction;
   (c) an electrical driving device that adjusts a spring force of the motive spring;
   (d) a clutch located between the electrical driving device and the belt reel to transmit a torque produced by the electrical driving device to the belt reel, the clutch comprising a deformable spring that can be deformed by the torque and when deformed, brings the clutch into an engaged state; and (e) a damping device located between belt reel and the electrical driving device, wherein the damping device compensates for relative movement between the belt reel and the electrical driving device when a load limiter is activated.

9. The seat belt retractor according to claim 8 wherein the damping device stores energy in its loaded state, and the energy stored by the damping device can be transmitted via the engaged clutch to the belt reel for releasing the blocking of belt extraction.

10. The seat belt retractor according to claim 8 wherein the damping device comprises at least one elastic torque-transmitting damping element.

11. The seat belt retractor according to claim 8 wherein, in the damping device, at least one rolling body comprising an elastically deformable material is guided so as to roll around a rolling track axis between two rolling surfaces comprising a solid material, the distance between the two rolling surfaces varying along its rolling track for elastic deformation of the respective rolling body or the rolling bodies.

12. The seat belt retractor according to claim 8 wherein, in the damping device, at least one rolling body comprising solid material is guided so as to roll around a rolling track axis between two rolling surfaces, of which at least one rolling surface comprises an elastic material, the distance between the two rolling surfaces varying along the rolling track of the respective rolling body for elastic deformation of the at least one rolling surface.

13. The seat belt retractor according to claim 11 wherein the two rolling surfaces are formed on two telescoping rings, torque transmission taking place between the outer ring and the rolling body or the rolling bodies.

14. The seat belt retractor according to claim 13 wherein the outer ring is connected to the electrical driving device and the rolling body or the rolling bodies are connected to the driver.

15. The seat belt retractor according to claim 13 wherein the inner ring is a free-wheel ring and has a cylindrical external surface forming one rolling surface, and the internal surface of the outer ring, forming the other rolling surface has a course differing from the cylindrical form.

16. The seat belt retractor according to claim 11 wherein the rolling track axis and the belt reel axis extend coaxially.

17. The seat belt retractor according to claim 8 wherein a set of worm gears is provided at the output of the electrical driving device for transmitting torque.

* * * * *